United States Patent [19]

Ohtake

[11] 4,254,696
[45] Mar. 10, 1981

[54] APPARATUS FOR FRYING INSTANT NOODLES

[75] Inventor: Kunihiko Ohtake, Tokyo, Japan

[73] Assignee: Ohtake Noodle Machine Mfg. Co., Ltd., Tokyo, Japan

[21] Appl. No.: 76,303

[22] Filed: Sep. 17, 1979

[30] Foreign Application Priority Data

Jul. 23, 1979 [JP] Japan ................................ 54-92664

[51] Int. Cl.³ .......................... A23L 1/16; A47J 37/00
[52] U.S. Cl. ......................................... 99/349; 99/404; 99/407; 99/443 C; 99/450; 426/439
[58] Field of Search ..................... 99/404, 443 C, 448, 99/450, 416, 427, 349, 407, 417; 426/438, 439, 451, 505, 512

[56] References Cited

U.S. PATENT DOCUMENTS

| 3,316,833 | 5/1967 | Williams | 99/443 C |
| 4,166,139 | 8/1979 | Ishida | 99/407 |
| 4,182,230 | 1/1980 | Sakurazawa | 99/443 C |
| 4,185,125 | 1/1980 | Sakakibara | 99/450 |

Primary Examiner—Billy J. Wilhite
Attorney, Agent, or Firm—Colton & Stone, Inc.

[57] ABSTRACT

Apparatus for frying instant noodles wherein a portion of steamed noodle to be fried is contained in a receptacle with a telescoping lid, the receptacle and the lid being mounted on the first and second conveyors respectively so as for the lid to telescope into the receptacle for a certain time according to the movement of the conveyors, during which time the telescoping depth of the lid is caused to vary to obtain a good frying condition.

3 Claims, 5 Drawing Figures

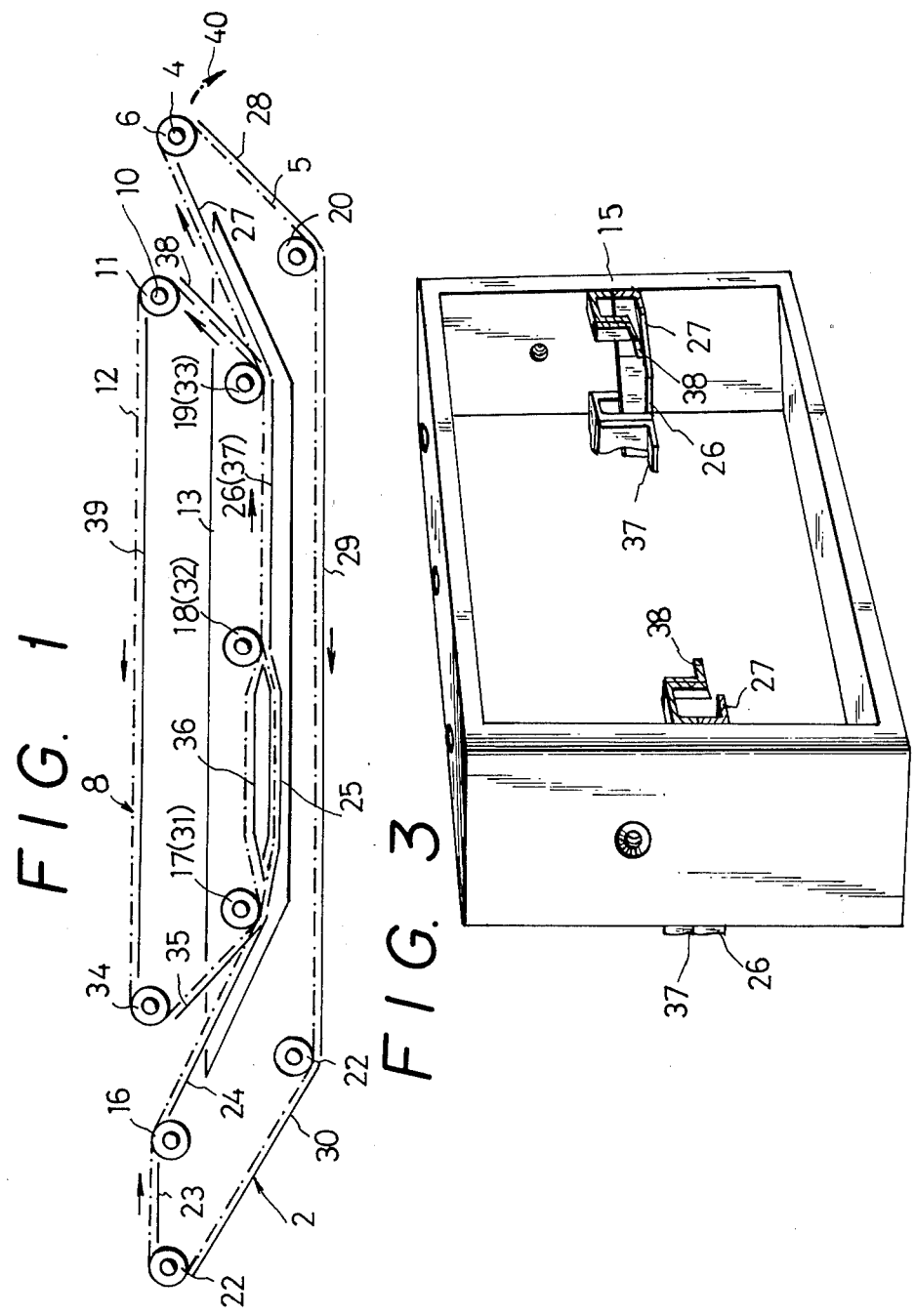

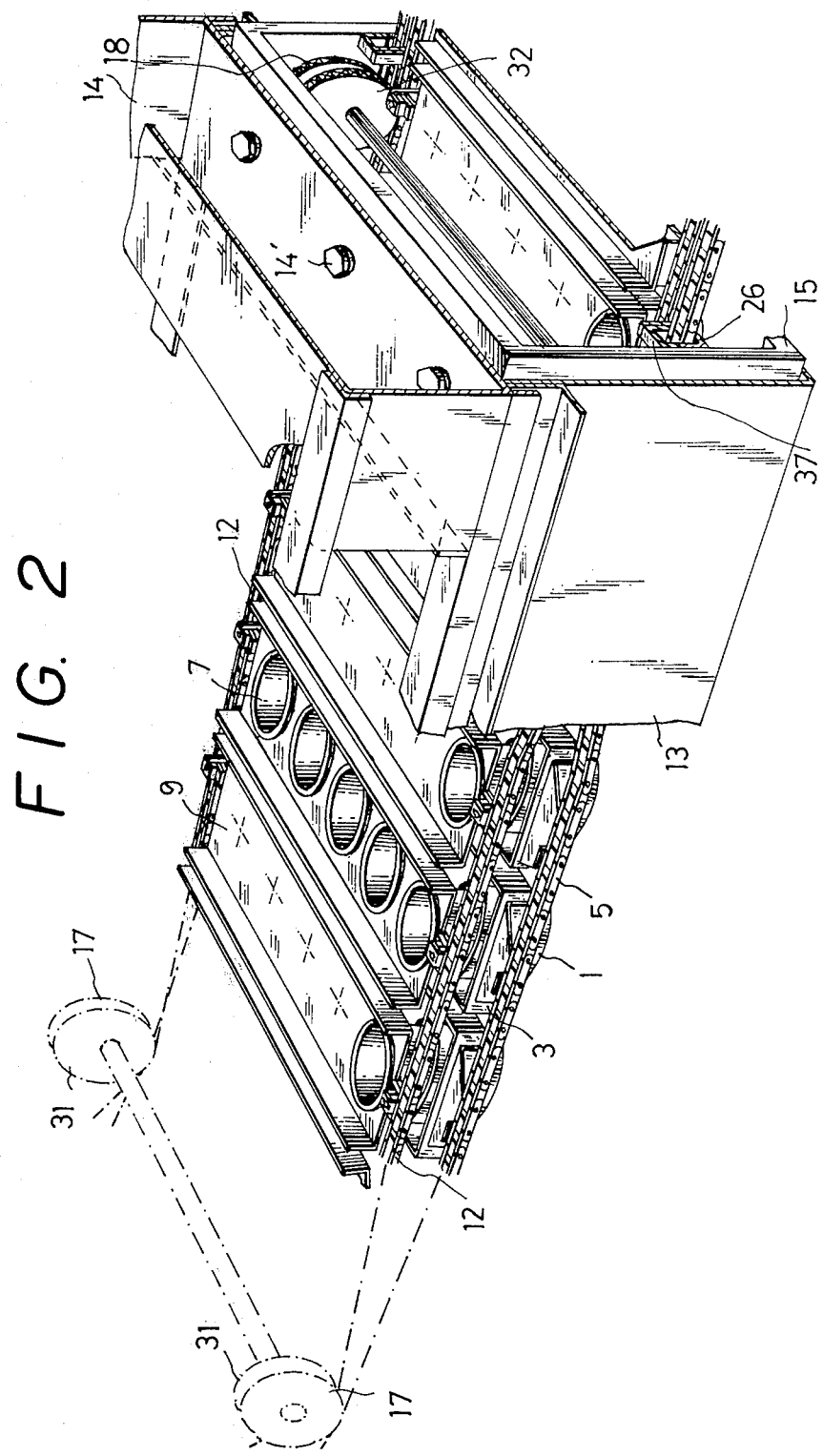

APPARATUS FOR FRYING INSTANT NOODLES

BACKGROUND OF THE INVENTION

The instant noodle is ordinarily prepared by frying a plurality of noodles divided per a certain quantity (i.e., ordinarily a meal) at one sitting after steaming these noodle in a similar manner, in which event each of the divided noodle is generally fried in a receptacle having the same internal capacity as the noodle capacity. However, in the event the noodles are contained in a relatively deep cup, frying is commonly accomplished by putting the noodles in a larger receptacle than the noodle capacity so that the finally-made fried noodles have no half-fried portions therein in virtue of the free movement of the noodles in the receptacle. With such a conventional technique, however, the buoyancy of the noodles results in the lower portion of the product being loosely packed while the upper portion is densely packed. The loosely packed noodles are likely to be broken, resulting in lowering of the product yield.

SUMMARY OF THE INVENTION

It is an object of this invention to provide a noodle frying apparatus capable of eliminating most simply and effectively aforegoing defect in the conventional manner. The present apparatus comprises two principal elements groups of noodle receptacles and telescoping lids thereof, the receptacles and the lids being mounted respectively on the slats of two slat-conveyors arranged in an above-and-below relation to move in a same speed according to the concurrent movement of the conveyors. On the way of the movement of the lids and receptacles, the lids are adapted to make a telescopic engagement with the corresponding receptacles respectively and to vary properly the telescoping depth according to the movement thereof, thereby the internal capacity of the receptacle may be properly adjusted to the noodle capacity contained therein in the frying course which, in turn, eliminates the above mentioned inconvenience in the conventional manner.

BRIEF DESCRIPTION OF THE DRAWINGS

FIG. 1 is a schematic side elevational view for explaining the operation of one form of the invention;

FIG. 2 is a fragmental perspective view of the same with parts being schematically depicted and with the conveyors being shortened properly in the length thereof for convenience' sake;

FIG. 3 is a perspective view of the suspending frame member to be disposed at such a position as combined with the shaft of the directing sprocket wheel 19 (33) in the same, with the fragmentally depicted guide-rails fixed thereto;

DETAILED DESCRIPTION OF THE PREFERRED EMBODIMENT

Figure 4:
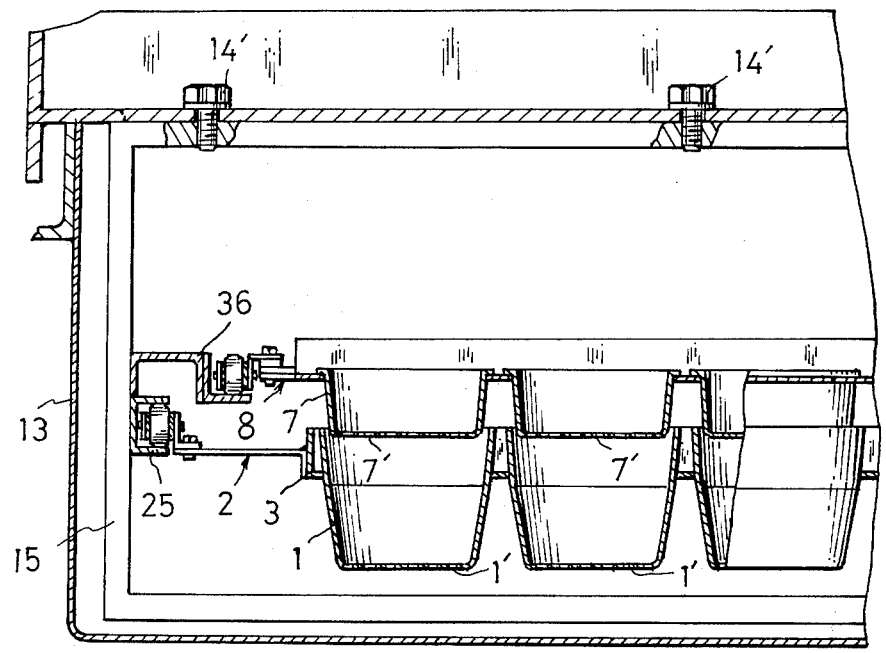
FIG. 4 is an enlarged fragmental, partially in section, side elevation showing the lids partly telescoped into the receptacles.
Figure 5:
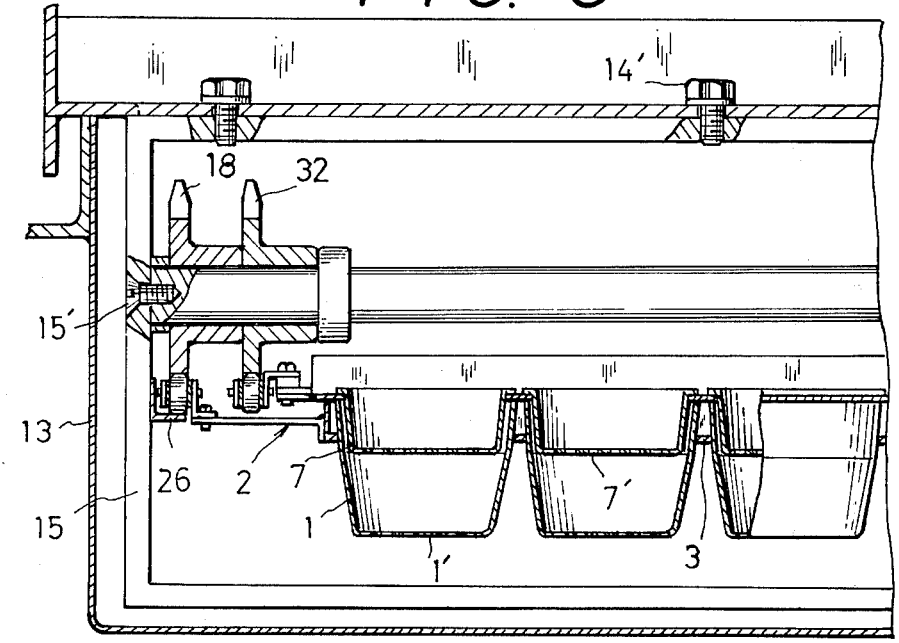
FIG. 5 is an enlarged fragmental, partially in section, side elevation showing the lids telescoped into the receptacles to the maximum.

In the drawings, 1 is a receptacle for frying use having a number of bores 1' in the bottom plate thereof (FIGS. 4 and 5), plural ones being mounted on each of the slats 3 of a first slat-conveyor 2 in lateral alignment as shown in FIGS. 4 and 5. The conveyor 2 is adapted to run clockwise by right and left roller-chains 5 driven through right and left driving sprocket wheels 6 fixed to a driving shaft 4 driven by a motor (not shown). 7 is a telescoping lid of the receptacle 1 having a number of bores 7' in the bottom plate thereof (FIGS. 4 and 5 and adapted to telescope into the receptacle from above, plural ones being mounted on each of the slats 9 of a second slat-conveyor 8 in lateral alignment as shown in FIG. 2. The second conveyor 8 is disposed above the first conveyor 2 to run counterclockwise through right and left roller-chains 12 driven by right and left driving sprocket wheels 11 fixed to a driving shaft 10 connected to a motor (not shown). 13 is an oil pan for frying oil heated by a heating device (not shown) arranged under the bottom plate of the pan. The conveyors 2 and 8 are adapted to move through the interior of the oil pan as shown in FIG. 1, for which purpose sections of these conveyors are suspended in the oil pan through a supporting frame 14 fixed to a main frame body (not shown) and a square-shaped suspending frame member 15 (FIG. 3) fixed to the supporting frame 14 by securing bolts 14'. A plurality of such frame members 15 of a proper width are disposed along the roller-chain paths in the oil pan, and guide-rails are attached to the insides of these frame members. A common shaft for sprocket wheels 18 and 32 is affixed to the frame member by screws 15'. The slats 3 and 9 of the first and second conveyors are arranged with the same pitch on the respective roller-chains and adapted for the latter to move in superposed relation to the former during a certain distance along the roller-chain paths in the oil pan. In that time, the relative position between the receptacles and lids is determined so as for the lids to be positioned respectively just above the corresponding receptacles and the vertical distance between the receptacles and the superposed lids is variable during said movements of the slats 3 and 9 in the oil pan so that the lids may be brought into telescopic fit into the corresponding receptacles to the maximum depth when the vertical distance is in the minimum and to a lesser depth when the vertical distance is increased.

As shown in FIG. 1, the moving paths of the first and second conveyors are defined by a right and left driving sprocket wheel pair 6, seven right and left directing sprocket wheel pairs 16 22, eight right and left roller-chain guide-rail pairs 23 30 in the former, a right and left driving wheel pair 11, four right and left directing sprocket wheel pairs 31 34 and five right and left roller-chain guide-rail pairs 35 39 in the latter (since, in this embodiment, the directing wheels 17, 18 and 19 of the first conveyor are fixed on the shafts being common to the wheel 31, 32 and 33 of the second conveyor respectively as observed from FIG. 1, there is no guide-rail for the roller-chain 12 of the second conveyor below the directing wheels 32 and 33 as observed from FIGS. 2, 3 and 5 but the guide-rail 37 is disposed between these wheels 32 and 33 as shown in FIGS. 2 and 3).

As observed from FIG. 2, the slats 9 of the second conveyor are adapted to move in the oil pan in a superposed relation to, in the same direction as and at the same speed as the slats 3 of the first conveyor. The slats 9, initially, once superposed on the slats 3 in a minimum vertical distance at the point of the directing wheel 17 (31) (this happens from the structural convenience in this embodiment) which will be followed by the enlargement of the vertical distance according to the respective roller-chain movements of the conveyors along the guide-rails 25 and 36. The roller-chains 5 and 12 will then reach the driving wheels 18 and 32 respectively thereupon those come to be on a same level to make the vertical distance between the slats 3 and 9 minimum again. When those pass through the driving wheels 19 and 33, both slats will be gradually separated with disengagement of their piled condition. That is, stated more particularly on the lids and receptacles, as the first and second conveyors reach the directing wheels 17 and 31 with the respective advances into the oil pan in the arrow direction in FIG. 1, the lids 7 are first brought into a full telescopic engagement with the corresponding receptacles in a same condition as shown in FIG. 5. With respective movement of the conveyors along the guide-rails 25 and 36, the vertical distance between the lids and receptacles increases as shown in FIG. 4. The lids are then telescoped into the receptacles to the maximum again as shown in FIG. 5 as the conveyors reach the driving wheels 18 and 32 respectively which will be followed by the successive movement of so telescoped lids to the next directing wheels 19 and 33. When the lids and receptacles pass through the directing wheel 19 (33), those come to move on the respective separate courses with the automatic disengagement thereof. Therefore, assuming that the internal capacity of the receptacle to be substantially same as the capacity of the noodle contained in the receptacle to be fried in the oil pan, the noodle is, initially, once placed in the receptacle of the same internal capacity as its own capacity but as the conveyors move, the noodles come to be fried in a larger capacity than their own because the lids engage into the receptacles as shown in FIG. 4 which assures the suitable flowing and even frying of the noodle despite of the relatively deep capacity thereof. Then, after a certain time (about 1.5 min. in this embodiment), in a half-fried pliable condition of the noodle, the lids are again brought into engagement with the receptacles as shown in FIG. 5 as the conveyors reach the respective directing wheels 18, 23 which compresses the noodle into the original capacity to permit the noodle to be fried in the same capacity as its own for a certain time (0.5 min. in this embodiment). Thus, the good quality fried noodle having no conventional defect of being liable to break comes to be obtainable despite of the raw noodle having comparatively deep (or thick) capacity. The removal of the fried noodle from the receptacle may be made at the position 40 shown by the dash line arrow in FIG. 1 according to the movement of the first conveyor.

According to this invention, an effective frying can be made even in the case of the instant noodle contained in a relatively deep cup, yet the finally-made fried noodle can be automatically removed from the receptacle in virtue of the gradual automatic disengagement of the lids from the receptacles resulting in the remarkable increase in the manufacturing efficiency. Furthermore, this invention has another outstanding feature that a number of bores are formed only in the bottom plate of the receptacle for flowing of the frying oil which permits the fried noodle to be removed smoothly from the receptacle. If the bores are formed in the barrel portion of the receptacle as the conventional ones the fried noodle in the receptacle would not be removed with ease in this case because of the entwinement of the fried noodle into the bores.

I claim:

1. Apparatus for frying noodles comprising:
   a container for heated cooking oil;
   a plurality of cup-shaped receptacles;
   first conveying means for moving said receptacles on a path which enters, moves through, and exits from said container;
   a plurality of lids for said receptacles, each lid being cup-shaped and adapted to be telescopingly received within the upper portion of a corresponding one of said receptacles;
   second conveying means for moving said lids in synchronization with and on a path closely paralleling said first conveying means; and
   guide means within said container for said first and second conveying means, said guide means having a first zone in which said lids are fully telescoped into corresponding ones of said receptacles, a following second zone in which said lids are partially raised from said corresponding ones of said receptacles and a following third zone in which said lids are fully telescoped into said corresponding ones of said receptacles.

2. The apparatus of claim 1 wherein said first and second conveying means each comprises a pair of laterally spaced roller chains and a plurality of slats extending transversely between and connected to said pair of chains, the slats of said first conveying means being adapted to support said receptacles and the slats of said second conveying means being adapted to support said lids.

3. The apparatus of claim 2 wherein said guide means comprises two pairs of guide rails, one pair of said rails being mounted on each side of the path of travel of said conveyor means within said container, each of said pairs of guide rails having a first guide rail guiding the corresponding chain of said first conveying means and the other of said pair of guide rails guiding the corresponding chain of said second conveying means.

* * * * *